H. SCHLARF.
POTATO FORK.
APPLICATION FILED JUNE 24, 1910.

971,863.

Patented Oct. 4, 1910.

Witnesses
A. M. Dow.
G. M. Shannon.

Inventor
Henry Schlarf
By Barthel & Barthel
Attorneys

UNITED STATES PATENT OFFICE.

HENRY SCHLARF, OF MAPLE RAPIDS, MICHIGAN.

POTATO-FORK.

971,863.  Specification of Letters Patent.  Patented Oct. 4, 1910.

Application filed June 24, 1910. Serial No. 568,624.

*To all whom it may concern:*

Be it known that I, HENRY SCHLARF, a citizen of the United States of America, residing at Maple Rapids, in the county of Clinton and State of Michigan, have invented certain new and useful Improvements in Potato-Forks, of which the following is a specification, reference being had therein to the accompanying drawings.

This invention relates to potato forks and like agricultural implements and has for its object to provide an attachment therefor which is designed to form a support and fulcrum to facilitate the digging of potatoes, weeding, prying out roots and stones and for like operations.

To this end the invention consists in the combination and arrangement of parts as will be hereinafter more fully described and shown in the accompanying drawings, in which—

Figure 1:
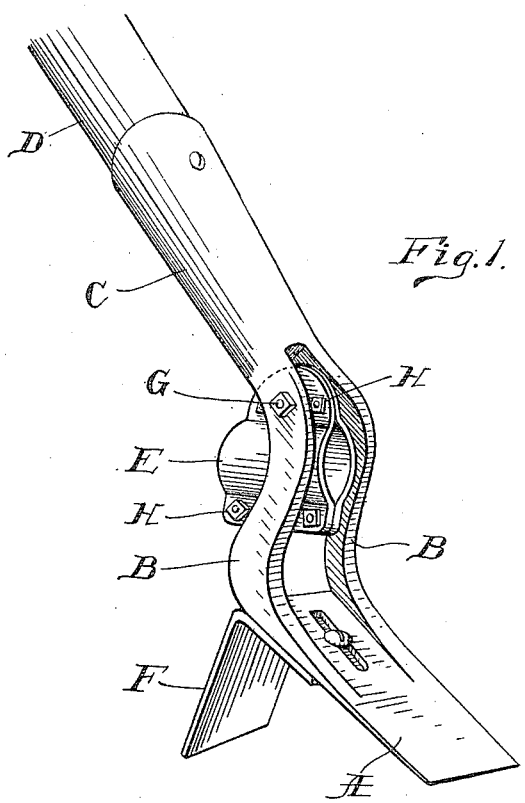
Figure 2:
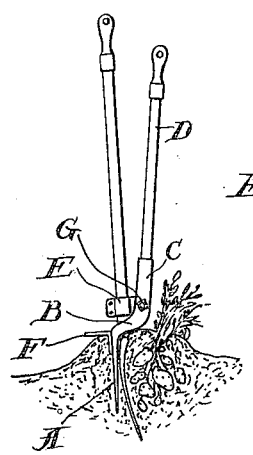

Figure 1 is a perspective view of the attachment with the handle partly broken off; and Fig. 2 is an elevation showing the device as in use in combination with a potato fork.

My fulcrum support consists of a spade-like implement comprising the blade A, the two shanks B, the socket C, the handle D and clamping collar E and gage F. The blade A, shanks B and socket C may be preferably cast or forged in one piece with the gage F made as a separate part and adjustably secured to the back of the blade A in any suitable manner. The clamping collar is removably secured by a removable bolt G in the open space between the shanks and has free play between them, it is preferably made in halves secured together by clamping bolts H. The handle D is preferably similar to that of the usual spade but it will be seen that the blade is considerably out of line with it owing to the bend of the shank which considerably offsets the blade to one side.

In practice the handle of the potato fork or other implement is firmly secured in the clamp and the two together can then be handled as one implement. By sticking them together into the ground on the side of a potato hill as shown in Fig. 2 and then pressing the potato fork to one side the potatoes can be lifted out of the ground and thrown to one side of the hill with the use of little force. During this operation the fulcrum can be readily shifted by the operator since he controls it by the handle D and by its judicious use he makes not only quicker work but he can throw the potatoes out sidewise into the space between the rows. The handle D is in other ways an advantage as will be readily understood by those familiar with the operation of digging potatoes, besides the attachment forms of itself a handy implement useful for different kinds of work in field and garden.

The gage E may be adjusted to suit the requirements besides controlling the depth of insertion into the ground it serves as a foot hold for pushing the device into the ground and being readily detachable it can be dispensed with if not needed.

What I claim as my invention is:—

1. A fulcrum support for potato fork and the like, consisting of a spade-like implement having its blade and handle connected by a pair of curved shanks uniting in a socket in which the handle is secured, and a clamping collar pivotally suspended between the shanks near the junction with the socket free to swing through the space between the shanks.

2. A fulcrum support for potato fork and the like consisting of a spade like implement having its blade and handle connected by two bent shanks offsetting the handle from the blade and forming a space between them, a clamping collar pivotally secured in the space between the shanks and a gage plate adjustably secured to the back of the blade.

3. A fulcrum support for potato fork and the like, consisting of a spade-like implement having its blade and handle connected by a pair of curved shanks uniting in a socket offsetting the handle from the blade, a clamping collar pivotally suspended between the shanks near the junction with the socket free to swing through the space between the shanks and a gage plate secured to the back of the blade.

In testimony whereof I affix my signature in presence of two witnesses.

HENRY SCHLARF.

Witnesses:
C. W. ALLEN,
PORTER P. OWEN.